(12) United States Patent
Imanishi et al.

(10) Patent No.: US 11,938,687 B2
(45) Date of Patent: Mar. 26, 2024

(54) PLANT FIBER-CONTAINING COMPOSITE RESIN MOLDED ARTICLE WITH SUSTAINED RELEASE OF AROMA

(71) Applicant: Panasonic Intellectual Property Management Co., Ltd., Osaka (JP)

(72) Inventors: Masayoshi Imanishi, Osaka (JP); Masashi Hamabe, Osaka (JP); Toshifumi Nagino, Osaka (JP); Shouma Nishino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

(21) Appl. No.: 17/505,084

(22) Filed: Oct. 19, 2021

(65) Prior Publication Data

US 2022/0126527 A1 Apr. 28, 2022

(30) Foreign Application Priority Data

Oct. 28, 2020 (JP) ................................. 2020-180736

(51) Int. Cl.
*B29C 70/14* (2006.01)
*B29K 23/00* (2006.01)
*C08K 7/02* (2006.01)

(52) U.S. Cl.
CPC ............... *B29C 70/14* (2013.01); *C08K 7/02* (2013.01); *B29K 2023/08* (2013.01); *B29K 2995/0041* (2013.01); *C08K 2201/007* (2013.01)

(58) Field of Classification Search
CPC .... B29C 70/14; C08K 7/02; C08K 2201/007; B29K 2023/08; B29K 2995/0041; C08L 2201/007; C08L 23/12; C08L 2205/03; C08L 2205/08; C08L 2205/16; C08L 1/02; C08L 51/06; A01P 17/00; A61L 9/01;
(Continued)

(56) References Cited

U.S. PATENT DOCUMENTS

| 2009/0209558 A1 | 8/2009 | Taft et al. |
| 2009/0246525 A1 | 10/2009 | Uchida et al. |
| 2009/0252777 A1 | 10/2009 | Taft et al. |

(Continued)

FOREIGN PATENT DOCUMENTS

| CN | 109337311 | 2/2019 |
| JP | 2004-201811 | 7/2004 |

(Continued)

OTHER PUBLICATIONS

Pawlak, A., Galeski, A. (2019). Crystallization of Polypropylene Polypropylene Handbook. Springer, Mar. 19, 2019.*

(Continued)

*Primary Examiner* — Camie S Thompson
(74) *Attorney, Agent, or Firm* — Wenderoth, Lind & Ponack, L.L.P.

(57) ABSTRACT

A plant fiber-containing composite resin molded article contains a base resin, plant fibers, and, a dispersant, in which each of the plant fibers contains an aroma component, the base resin is a crystalline resin, and in a case where a total content of the base resin, the plant fibers, and the dispersant is 100% by mass, a content of the plant fibers is more than or equal to 50% by mass and less than or equal to 90% by mass.

12 Claims, 4 Drawing Sheets

(58) Field of Classification Search
CPC ......... A01N 27/00; A01N 25/34; A01M 1/22; C08J 2323/12; C08J 2423/26
USPC ...................................................... 428/297.4
See application file for complete search history.

(56) References Cited

U.S. PATENT DOCUMENTS

| | | |
|---|---|---|
| 2011/0009571 A1 | 1/2011 | Taft et al. |
| 2012/0142581 A1 | 6/2012 | Taft et al. |
| 2017/0098822 A1 | 4/2017 | Yachi et al. |
| 2017/0334105 A1 | 11/2017 | Mikami et al. |
| 2020/0024409 A1 | 1/2020 | Takeyama et al. |
| 2020/0062930 A1 | 2/2020 | Imanishi et al. |
| 2020/0255619 A1 | 8/2020 | Takahashi et al. |

FOREIGN PATENT DOCUMENTS

| | | |
|---|---|---|
| JP | 2005-146124 | 6/2005 |
| JP | 2008-156616 | 7/2008 |
| JP | 2010-240618 | 10/2010 |
| JP | 2011-505420 | 2/2011 |
| JP | 2016-204820 | 12/2016 |
| JP | 2017-105865 | 6/2017 |
| JP | 2019-154289 | 9/2019 |
| JP | 2020-131459 | 8/2020 |
| WO | 2008/078682 | 7/2008 |
| WO | 2015/147234 | 10/2015 |
| WO | 2018/066433 | 4/2018 |
| WO | 2020/138144 | 7/2020 |

OTHER PUBLICATIONS

Extended European Search Report dated Mar. 28, 2022 in corresponding European Patent Application No. 21201189.4, 10 pages.
Database WPI Week 201976 Thomson Scientific, London, GB; AN 2019-80661P XP002805882, 2 pages.
Database WPI Week 201927 Thomas Scientific, London, GB; AN 2019-7736D XP002805883, 3 pages.

* cited by examiner

FIG. 3A

| | Material condition | | | | | | Process condition | | | |
|---|---|---|---|---|---|---|---|---|---|---|
| | Amount of base resin [wt%] | Amount of plant fiber [wt%] | Amount of dispersant [wt%] | Presence or absence of aroma component in plant fiber | Crystallinity of resin | Average particle diameter of plant fiber [μm] | Variation in particle diameter of fiber Δd | Resin temperature [°C] | Mold temperature [°C] | Injection rate [mm/s] | Dwelling pressure [MPa] |
| Example 1 | 43 | 55 | 2 | B | B | 50 | 6 | 200 | 40 | 60 | 80 |
| Example 2 | 27 | 70 | 3 | B | B | 50 | 6 | 200 | 40 | 60 | 80 |
| Example 3 | 43 | 55 | 2 | B | B | 1000 | 6 | 200 | 40 | 60 | 80 |
| Example 4 | 43 | 55 | 2 | B | B | 50 | 6 | 200 | 60 | 60 | 80 |
| Example 5 | 43 | 55 | 2 | B | B | 50 | 10 | 200 | 40 | 60 | 80 |
| Example 6 | 43 | 55 | 2 | B | B | 50 | 2 | 200 | 40 | 60 | 80 |
| Example 7 | 43 | 55 | 2 | B | B | 50 | 6 | 200 | 40 | 100 | 80 |
| Example 8 | 43 | 55 | 2 | B | B | 50 | 6 | 210 | 40 | 20 | 80 |
| Comparative example 1 | 43 | 55 | 2 | B | D | 50 | 6 | 190 | 40 | 60 | 80 |
| Comparative example 2 | 43 | 55 | 2 | D | B | 50 | 6 | 200 | 40 | 60 | 80 |
| Comparative example 3 | 89 | 10 | 1 | B | B | 50 | 6 | 200 | 40 | 60 | 80 |
| Comparative example 4 | 2.5 | 95 | 2.5 | B | B | 50 | 6 | 200 | 40 | 60 | 80 |

FIG. 3B

Characteristics of composite resin molded article

| | Sensuousness evaluation (comfort of scent) | Sensuousness evaluation (intensity of scent) | Sensuousness evaluation | Aroma sustained release evaluation (intensity of scent) | Aroma sustained release test | Elastic modulus [GPa] | Crystallinity [%] | Crystallinity around fiber | Angle of fiber in skin layer [°] | Thickness of skin layer [μm] |
|---|---|---|---|---|---|---|---|---|---|---|
| Example 1 | 6 | 4 | B | 4 | B | 4.2 | 53 | 1.12 | 10 | 430 |
| Example 2 | 7 | 5 | B | 4 | B | 5.1 | 63 | 1.13 | 13 | 420 |
| Example 3 | 6 | 4 | B | 4 | A | 4.4 | 55 | 1.12 | 12 | 428 |
| Example 4 | 6 | 4 | B | 4 | A | 4.5 | 64 | 1.15 | 14 | 417 |
| Example 5 | 6 | 4 | B | 4 | A | 4.3 | 56 | 1.13 | 12 | 423 |
| Example 6 | 6 | 4 | B | 3 | C | 4.3 | 54 | 1.13 | 15 | 436 |
| Example 7 | 6 | 4 | B | 4 | A | 4.3 | 59 | 1.15 | 10 | 357 |
| Example 8 | 6 | 4 | B | 3 | C | 4.2 | 56 | 1.13 | 14 | 512 |
| Comparative example 1 | 5 | 1 | D | 1 | D | 3.9 | 53 | 1.09 | 14 | 422 |
| Comparative example 2 | 6 | 4 | B | 2 | D | 4.9 | 0 | 0 | 12 | 443 |
| Comparative example 3 | 5 | 2 | D | 1 | D | 2.0 | 43 | 1.13 | 13 | 437 |
| Comparative example 4 | | | | | | | | | | |

PLANT FIBER-CONTAINING COMPOSITE RESIN MOLDED ARTICLE WITH SUSTAINED RELEASE OF AROMA

BACKGROUND

1. Technical Field

The present disclosure relates to a plant fiber-containing composite resin molded article with a sustained release of aroma.

2. Description of the Related Art

So-called "general-purpose plastics" such as polyethylene (PE) and polypropylene (PP) have characteristics of being relatively inexpensive, weighing a fraction of the weight of metals or ceramics, and being easy to process molding or the like. Therefore, the general-purpose plastics are used as materials of various daily supplies such as bags, various packaging, various containers, and sheets, also used for industrial components such as automobile components and electric components, daily necessities, miscellaneous articles, and the like.

In recent years, sensuous characteristics are required with respect to familiar products such as daily necessities and daily supplies which are formed using a resin, consumer electronics housings, and appearance components such as automotive interior and exterior components as an added value other than basic performance. Examples of the sensuous characteristics include texture and tactile sensation such as touch feeling, color, scent, and the like. In particular, the scent is suitably imparted to familiar products due to effects of improving mood, relaxation, and the like. Examples of a method of imparting scent to a resin include a method of supporting or containing an aroma component in a resin, and the like.

On the other hand, even though scent is good, the scent is unpleasant in a case of a large amount thereof being used. Therefore, it is necessary to release an appropriate amount of scent. In addition, since the scent is based on an aroma component that is a volatile component, it is difficult to maintain the effect of the scent for a long period of time, that is, to impart a sustained release of aroma. Therefore, a release amount and a release rate of the aroma component cannot be controlled by simply supporting or containing the aroma component in the resin, which caused unpleasant feeling or the scent not to be maintained for a long period of time adversely. In Japanese Patent Unexamined Publication No. 2004-201811, an appropriate amount of an aroma component is sustained and released for a long period of time by supporting the aroma component in a composite resin containing cellulosic particles.

SUMMARY

A composite resin molded article according to one aspect of the present disclosure containing a base resin, plant fibers, and a dispersant, in which each of the plant fibers contains an aroma component, the base resin is a crystalline resin, and in a case where a total content of the base resin, the plant fibers, and the dispersant is 100% by mass, a content of the plant fibers is more than or equal to 50% by mass and less than or equal to 90% by mass.

BRIEF DESCRIPTION OF THE DRAWINGS

FIG. 3A is a diagram illustrating conditions in Examples 1 to 8 and Comparative Examples 1 to 4; and FIG. 3B is a diagram illustrating measurement results in Examples 1 to 8 and Comparative Examples 1 to 4.

DETAILED DESCRIPTIONS

Figure 1:
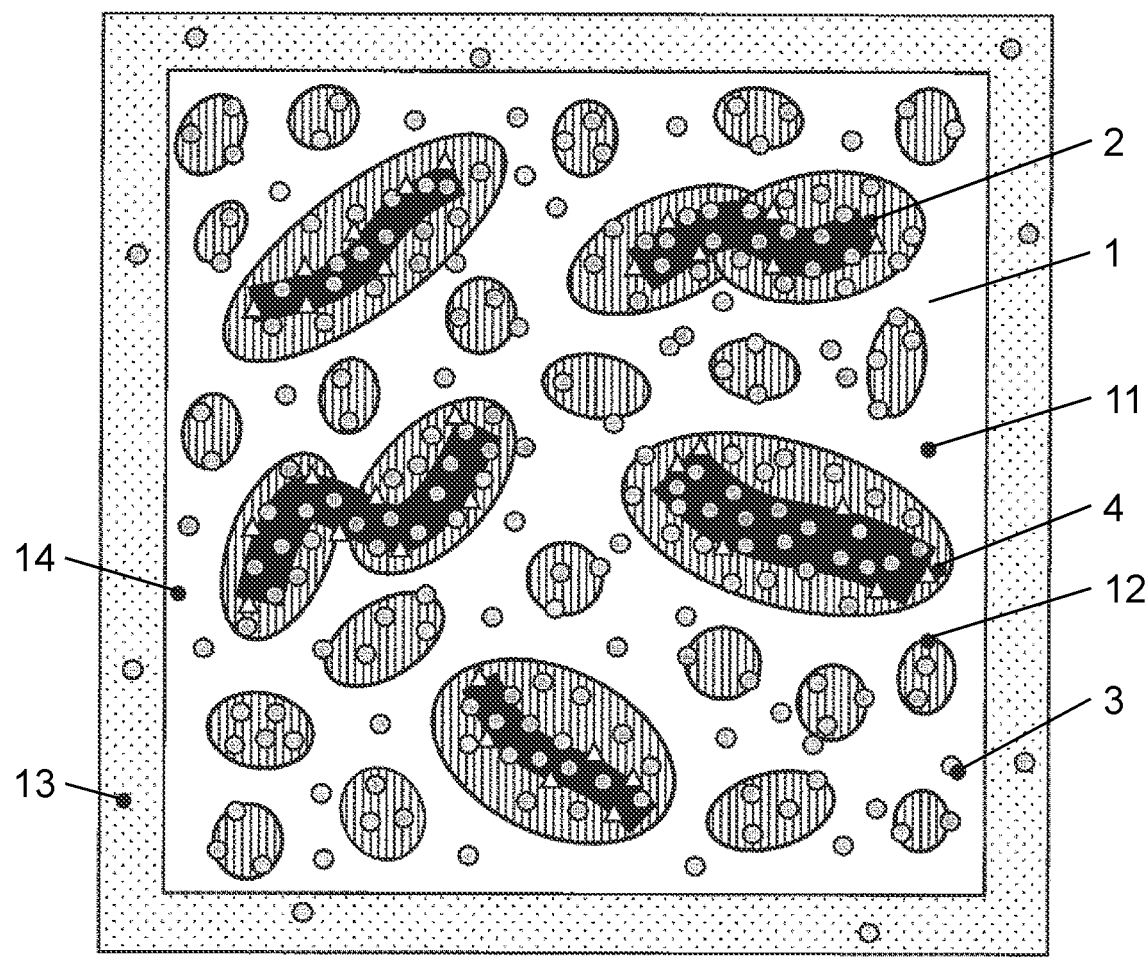
FIG. 1 is a schematic view illustrating a configuration of a plant fiber-containing composite resin molded article according to a first exemplary embodiment.

In a composite resin described in Japanese Patent Unexamined Publication No. 2004-201811, since the release rate of the aroma component is controlled only by a repetition rate (respiratory rate) of moisture absorption and drying of the cellulosic particles in the composite resin, the release rate greatly changes depending on surrounding environmental conditions. Therefore, there is a problem that a sustained release of aroma cannot be stably maintained for a long period of time only under a specific environment. There is also a problem that a step of separately supporting the aroma component in the composite resin is required.

The present disclosure is to solve the above described problems in the related art, and an object of the present disclosure is to provide a composite resin molded article with a sustained release of aroma for a long period of time without depending on surrounding environmental conditions.

A composite resin molded article according to a first aspect includes a base resin, plant fibers, and a dispersant, in which each of the plant fibers contains an aroma component, the base resin is a crystalline resin, and in a case where a total content of the base resin, the plant fibers, and the dispersant is 100% by mass, a content of the plant fibers is more than or equal to 50% by mass and less than or equal to 90% by mass.

In the first aspect, in the composite resin molded article according to a second aspect, an average particle diameter of the plant fibers may be greater than or equal to 1 μm and smaller than or equal to 3 mm.

In the first or second aspect, in the composite resin molded article according to a third aspect, crystallinity of the base resin may be more than or equal to 30%.

In any one of the first to third aspects, in the composite resin molded article according to a fourth aspect, a crystallinity a portion of the base resin close to the plant fibers in the composite resin molded article may be greater than or equal to 1.05 times a crystallinity of a portion of the base resin away from the plant fibers in the composite resin molded article.

In any one of the first to fourth aspects, in the composite resin molded article according to a fifth aspect, a particle diameter variation $\Delta d$ may be greater than or equal to 6, the particle diameter variation $\Delta d$ being represented by $\Delta d = d90/d10$ using a particle diameter $d90$ and a particle diameter $d10$, a ratio of particles smaller than or equal to the particle diameter $d90$ in a particle size distribution of the plant fibers being 90%, a ratio of particles smaller than or equal to the particle diameter $d10$ in the particle size distribution of the plant fibers being 10%.

In any one of the first to fifth aspects, in the composite resin molded article according to a sixth aspect, a fiber length direction of the plant fiber in a skin layer of the composite resin molded article may be oriented at an angle greater than or equal to 0° and smaller than or equal to 30° with respect to a surface of the composite resin molded article.

In any of the first to sixth aspects of the composite resin molded article according to a seventh aspect, a thickness of the skin layer on the surface of the composite resin molded article may be smaller than or equal to 600 μm.

Since the composite resin molded article according to the present disclosure uses the plant fiber containing an aroma component therein and the crystalline resin in the base resin, and contains the plant fiber having a high concentration of more than or equal to 50% by mass and less than or equal to 90% by mass, the composite resin molded article has high crystallinity around the plant fiber and high crystallinity of the entire resin, and has the suppressed release rate of the aroma component volatilized from the plant fiber. Therefore, this composite resin molded article has a sustained release of aroma for a long period of time.

Hereinafter, the plant fiber-containing composite resin molded article according to exemplary embodiments will be described with reference to the drawings. In the following description, the same components are designated by the same reference numerals, and the descriptions thereof are not repeated as appropriate.

First Exemplary Embodiment

Figure 2:
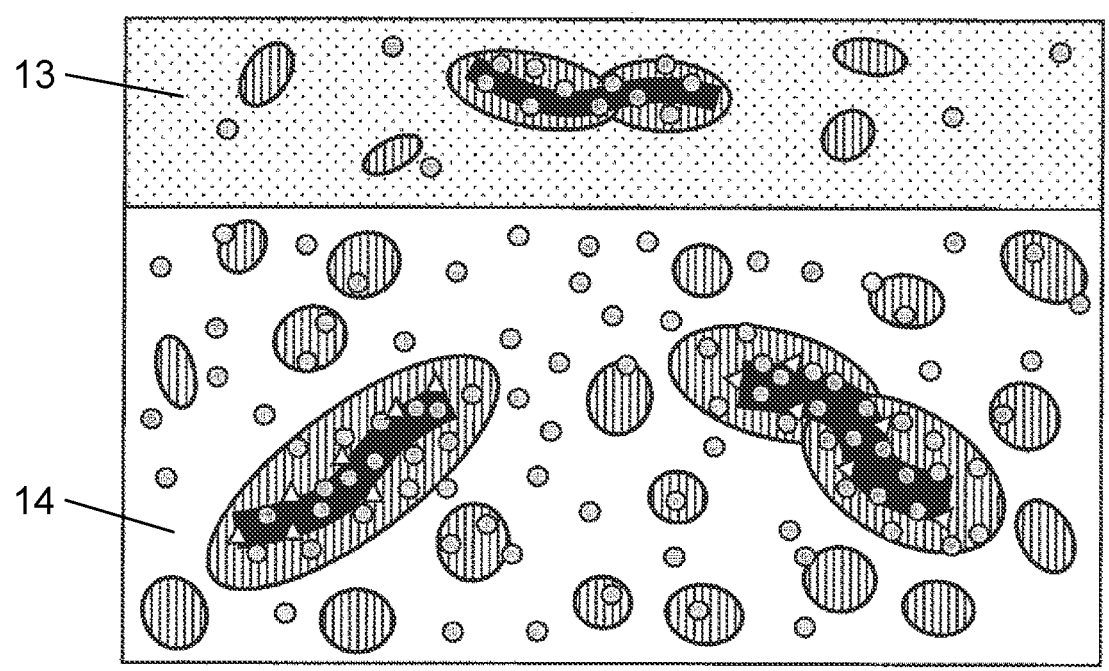
FIG. 2 is a schematic view illustrating an orientation and a crystalline state of plant fibers between a skin layer and a core layer of the composite resin molded article according to the first exemplary embodiment.

FIG. 1 is a schematic view illustrating a configuration of plant fiber-containing composite resin molded article 10 according to a first exemplary embodiment. FIG. 2 is a schematic view illustrating an orientation and a crystalline state of plant fibers between a skin layer and a core layer of composite resin molded article 10 according to the first exemplary embodiment. Composite resin molded article 10 according to the first exemplary embodiment consists of base resin 1 formed of a matrix of amorphous portion 11 and crystalline portion 12, plant fiber 2, aroma component 3, and dispersant 4. As illustrated in FIG. 1, in composite resin molded article 10, plant fiber 2, aroma component 3, and dispersant 4 are dispersed in the matrix of base resin 1, aroma component 3 exists inside plant fiber 2 or the matrix of base resin 1, and dispersant 4 exists at an interface between plant fiber 2 and base resin 1, or the like. In addition, as illustrated in FIG. 2, the composite resin molded article is largely divided into two layers, skin layer 13 on a surface and core layer 14 therein. In a case where a molten resin enters a mold during molding, a surface of the resin in contact with a surface of the mold is rapidly cooled, and the internal resin other than the resin in contact with the surface of the mold is slowly cooled. Since a cooling rate differs between the surface and the inside of the composite resin molded article, characteristics such as crystallinity are different, and it is possible to distinguish between the skin layer and the core layer by microscopic observation or the like. In the present specification, a layer on the surface of the molded article that is rapidly cooled during the molding is defined as the skin layer, and a layer inside the molded article that is slowly cooled during the molding is defined as the core layer. Since this composite resin molded article 10, for example, uses plant fiber 2 containing an aroma component and crystalline base resin 1 and contains plant fiber 2 having a high concentration of more than or equal to 50% by mass and less than or equal to 90% by mass, composite resin molded article 10 has high crystallinity around plant fiber 2 and high crystallinity of the entire resin, and has a suppressed release rate of aroma component 3 volatilized from plant fiber 2. Therefore, composite resin molded article 10 has a sustained release of aroma for a long period of time.

Hereinafter, members constituting composite resin molded article 10 will be described.

Base Resin

Base resin 1 in the exemplary embodiment is preferably a crystalline resin in order to suppress the release of volatile components, and more preferably a thermoplastic resin in order to ensure good moldability. Examples of the crystalline resin include olefin resins (including cyclic olefin resins), polyamide resins, polyphenylene ether resins (such as polymers of 2,6-xylenol), crystalline polyester resins, halogen-containing resins, liquid crystal polymer resins, and the like. The above resins may be used alone, or two or more kinds thereof may be used in combination. The base resin is not limited to the above materials as long as the base resin has crystalline nature. In addition, in a case where two or more kinds of resins are used, it is sufficient that at least one kind of resin has crystalline nature.

Among these crystalline resins, the base resin is preferably an olefin resin having a relatively low melting point. The olefin resin includes a copolymer of an olefin monomer and a copolymer of an olefin monomer and another copolymerizable monomer as well as a homopolymer of an olefin monomer. Examples of the olefin monomer include chain olefins (such as $\alpha$-C2-20 olefins such as ethylene, propylene, 1-butene, isobutene, 1-pentene, 4-methyl-1-pentene, and 1-octene), cyclic olefins, and the like. These olefin monomers may be used alone, or two or more kinds thereof may be used in combination. Among the olefin monomers, chain olefins such as ethylene and propylene are preferable. Specific examples of the olefin resin include copolymers of chain olefins (particularly $\alpha$-C2-4 olefins) such as ternary copolymers such as polyethylene (such as low density, medium density, high density, or linear-low density polyethylene), polypropylene, ethylene-propylene copolymers, and ethylene-propylene-butene-1.

Base resin 1 is preferably a crystalline resin. A crystalline portion has a denser structure than an amorphous portion. Therefore, a diffusion rate of liquid or gas in the crystalline portion is significantly reduced as compared with the amorphous portion. Since the aroma component diffuses in the composite resin molded article as a gas or liquid component, the diffusion rate is largely reduced in the crystalline portion as compared with the amorphous portion. Due to the presence of the crystalline portion in the resin, the diffusion rate of the aroma component is reduced, so that the release of the aroma component from the composite resin molded article can be maintained for a long period of time, that is, the aroma component can be sustained and released. Therefore, base resin 1 is preferably a crystalline resin.

Plant Fiber

Examples of raw materials of plant fiber 2 in the exemplary embodiment include natural materials such as pulp, wood (conifer, hardwood), cotton linter, kenaf, Manila hemp (abaca), sisal hemp, jute, sabai grass, esparto grass, bagasse, rice straw, straw, wheat, reeds, bamboo and tea leaves. Plant waste materials that are discarded after commercial use, such as sake barrels, may be used. In addition, a natural material modified with a sensual monomer containing an acid, an amine, an epoxy, or the like may be used. Plant fiber 2 is preferably a fiber shape or a particle shape obtained by crushing the above natural materials.

Aroma Component

Aroma component 3 in the exemplary embodiment is preferably a component derived from a natural material or a component generated by a component that is derived from a natural material in a step of producing a material deteriorating, and aroma component 3 more preferably has a volatile property. Examples of the aroma component include pinene, casinol, hinokiol, and the like. The aroma component is not limited to the above described components as long as the aroma component is a component contained in the plant fiber.

Dispersant

Examples of dispersant 4 in the exemplary embodiment include various titanate coupling agents, silane coupling agents, unsaturated carboxylic acids, maleic acids, maleic anhydride or modified polyolefin grafted with the anhydride, fatty acids, fatty acid metal salts, fatty acid esters, and the like. The silane coupling agents are preferably unsaturated hydrocarbon silane coupling agents and epoxy silane coupling agents. A surface of the dispersant may be treated with a thermosetting or thermoplastic polymer component to be modified. Dispersant 4 is appropriately selected depending on a combination of base resin 1 and plant fiber 2.

Plant fiber 2 is preferably a plant fiber containing an aroma component, and the aroma component is preferably derived from a plant fiber. In a case of using a plant fiber containing no aroma component, a separate step of supporting an aroma component is required. For example, in a case where the aroma component is supported on a composite resin composition, a post-process such as immersing the composite resin composition in oil having the aroma component is required. In addition, since the plant fiber-containing composite resin molded article has the texture of the plant fiber in its appearance, in a case where the aroma component is a component other than the component derived from the plant fiber, a sense of discrepancy is generated between the appearance and the scent, and the sensuousness of the composite resin molded article as a whole may be reduced. Therefore, the plant fiber is preferably a plant fiber containing an aroma component, and the aroma component is preferably derived from a plant fiber.

The total amount of base resin 1, plant fiber 2, and dispersant 4 in the composite resin molded article is 100% by mass. Since aroma component 3 is contained in plant fiber 2, the amount of aroma component 3 is contained in the amount of plant fiber 2.

A content of the plant fiber in the composite resin molded article is preferably more than or equal to 50% by mass and less than or equal to 90% by mass, and more preferably more than or equal to 55% by mass and less than or equal to 75% by mass, from the viewpoint of an increase in a content of the aroma component and crystallinity of the base resin.

As illustrated in FIG. 1, the composite resin molded article is formed of base resin 1, plant fiber 2, aroma component 3, and dispersant 4. Base resin 1 functions as a matrix, and has a structure in which plant fiber 2, aroma component 3, and dispersant 4 are dispersed in the base resin. In the composite resin molded article, plant fiber 2 has an effect of improving the crystallinity of the base resin by functioning as a crystal nucleating agent in addition to serving as a release source of aroma component 3. Since plant fiber 2 functions as a crystal nucleating agent, the proportion of the crystalline portion present around plant fiber 2 is large. That is, plant fiber 2 has a pseudo core-shell structure in which plant fiber 2 can be regarded as a core and the crystalline portion can be regarded as a shell structure.

Due to this structure, the diffusion rate of aroma component 3 from the inside of plant fiber 2 to base resin 1 is greatly suppressed.

In a case where the content of the plant fiber is less than 50%, the total amount of the aroma component is small, and the sustained release of aroma cannot be maintained for a long period of time. In addition, since the crystallinity of the entire base resin is lowered, an effect of suppressing the diffusion rate of the aroma component is reduced. In a case where the content of the plant fiber is more than or equal to 90%, a content of the base resin is too small as compared with the content of the plant fiber. Therefore, plant fiber 2 cannot be contained in base resin 1, and a large amount of plant fibers 2 are exposed on the surface of the base resin, so that the release of aroma component 3 cannot be suppressed. In addition, since the content of the base resin is too small, the fluidity of the composite resin composition is remarkably reduced, and kneading and injection molding cannot be stably carried out. Therefore, the content of the plant fiber in the composite resin molded article is preferably in a range of more than or equal to 50% by mass and less than or equal to 90% by mass.

The average particle diameter of plant fiber 2 is preferably greater than or equal to 1 μm and smaller than or equal to 3 mm, and more preferably greater than or equal to 20 μm and smaller than or equal to 1 mm. Since the size of the plant fiber is small in a case where the average particle diameter is smaller than 1 μm, the amount of the aroma component retained per fiber is small. In addition, since a surface area per fiber is greatly increased, the aroma component cannot be added to the base resin at a high concentration. In a case where the average particle diameter is greater than 3 mm, the plant fibers cannot be uniformly dispersed in the base resin, and the sustained release of the aroma component in the composite resin molded article varies in the composite resin molded article. Therefore, the average particle diameter of plant fiber 2 is preferably in a range of greater than or equal to 1 μm and smaller than or equal to 3 mm.

The crystallinity of base resin 1 is preferably more than or equal to 30% and more preferably more than or equal to 60%. In a case where the crystallinity of base resin 1 is less than 30%, the proportion of the amorphous portion is large. Therefore, the diffusion rate of the aroma component cannot be suppressed so much, and the composite resin molded article cannot have the sustained release for a long period of time. Therefore, the crystallinity of base resin 1 is preferably more than or equal to 30%.

The crystallinity of base resin 1 around the plant fiber in the composite resin molded article is preferably greater than or equal to 1.05 times and more preferably greater than or equal to 1.10 times crystallinity of a portion containing base resin 1 only. Since the crystallinity of the base resin around the plant fiber is low in a case where the crystallinity of the base resin around the plant fiber is smaller than 1.05 times crystallinity of the portion containing the base resin only, the pseudo core-shell structure formed with the plant fiber and the resin around the plant fiber cannot be formed. That is, the aroma component cannot be trapped in the plant fiber, and the release rate cannot be suppressed. Therefore, the crystallinity of base resin 1 around the plant fiber in the composite resin molded article is preferably greater than or equal to 1.05 times crystallinity of the portion containing base resin 1 only.

A variation in the particle diameter of plant fiber 2 is preferably $\Delta d \geq 6$, and more preferably $\Delta d \geq 8$. In the present specification, $\Delta d$ is used as an index representing the variation in the particle diameter. $\Delta d$ is a value obtained by dividing the value of d90 of the particle size distribution by d10, and is defined by the following formula.

$$\Delta d = d90/d10$$

d90 is a particle diameter in which a ratio of particles smaller than or equal to a value of the particle diameter is 90% in the particle size distribution, and d10 is a particle diameter in which a ratio of particles smaller than or equal to a value of the particle diameter is 10% in the particle size distribution.

Since the amount of the aroma component contained in the plant fiber changes depending on the size of the plant fiber, the release rate of the aroma component changes depending on the fiber size. Since the variation in the plant fiber is small in a case where the variation in the particle diameter is $\Delta d < 6$, the release rate of the aroma component from the plant fiber is constant, and the sustained release is reduced. Therefore, the variation in the particle diameter of plant fiber 2 is preferably $\Delta d \geq 6$.

A fiber length direction of plant fiber 2 in the skin layer of the composite resin molded article is preferably oriented at an angle greater than or equal to 0° and smaller than or equal to 30° with respect to a surface of the composite resin. An end portion of plant fiber 2 in the fiber length direction is particularly defibrated on a fiber surface due to kneading during the production of the composite resin molded article. A surface area of the defibrated portion is greater than that of a non-defibrated portion, and the release of the aroma component is faster. In a case where the fiber length direction of the plant fiber in the skin layer on the surface is oriented at an angle greater than 30° with respect to the skin layer, the aroma component is released faster in a skin layer direction, so that the sustained release of aroma is reduced. Therefore, the fiber length direction of plant fiber 2 in the skin layer is preferably oriented at an angle greater than or equal to 0° and smaller than or equal to 30° with respect to the surface of the composite resin molded article.

A thickness of the skin layer on the surface of the composite resin molded article is preferably smaller than or equal to 600 μm. In a case where molding is performed by injection molding, the molten resin is injected into the mold, and the surface portion in contact with the mold is rapidly cooled to form the skin layer. On the other hand, the inner core layer is formed while being slowly cooled. Since a crystal grows by being slowly cooled, the skin layer formed by rapid cooling has a low crystallinity, and the core layer formed by slow cooling has a high crystallinity. In a case where the thickness of the skin layer is greater than 600 μm, the proportion of the skin layer portion having a low crystallinity increases. Therefore, the release rate of the aroma component cannot be suppressed, and the sustained release of aroma is reduced. Therefore, the thickness of the skin layer on the surface of the composite resin molded article is preferably smaller than or equal to 600 μm.

As a kneading device used in a method of producing the composite resin molded article, a kneader, a Banbury mixer, an extruder, and a roll kneader are preferable. Among these, it is more preferable to use a twin-screw kneader and a roll kneader. The kneading device is not limited to the above devices as long as the kneading device has a rotor as kneading means. In addition, since the aroma component contained in the plant fiber is a volatile component, the kneading is preferably performed at a low temperature as much as possible.

EXAMPLES

FIG. 3A illustrates conditions of Examples 1 to 8 and Comparative Examples 1 to 4, and FIG. 3B illustrates measurement results of Examples 1 to 8 and Comparative Examples 1 to 4.

Example 1

A plant fiber-containing composite resin composition was produced by a production method described below. As described above, a kneader, a Banbury mixer, an extruder, a roll kneader, or the like can be used as the kneading device, but in the exemplary embodiment, a twin-screw kneader is used.

Polypropylene as the base resin, Japanese cypress powder as the plant fiber, which is obtained by Japanese cypress being crushed with a crusher and which has an average particle diameter of 50 μm and a variation Δd of a particle diameter of the plant fiber of 6, and maleic anhydride-modified polypropylene as the dispersant are weighed to have a mass ratio of 43:55:2 and dry-blended.

The dry-blended raw material was supplied to the kneading device at 2 kg/h by a weight feeder. As described above, a twin-screw kneader (TEX30a manufactured by The Japan Steel Works, LTD.) was used as the kneading device. As screws, a specification of an intermediate shear type was adopted. A composite resin discharged from the twin-screw kneader was hot-cut, and a plant fiber-containing composite resin pellet was prepared.

By using the prepared plant fiber-containing composite resin pellet, a specimen of the composite resin molded article was prepared with an injection molding machine (180AD manufactured by The Japan Steel Works, Ltd.). Preparation conditions of the specimen were such that a resin temperature was set at 200° C., a mold temperature was set at 40° C., an injection rate was set at 60 mm/s, and a dwelling pressure was set at 80 MPa. The pellet was taken in screws of the molding machine with aid of the hopper, and the intrudability of the pellet was measured on the basis of the reduction amount per unit time of the pellet and was verified to be constant. A shape of the specimen was varied according to the following evaluation items. A dumbbell specimen having a No. 1 size was prepared for the measurement of elastic modulus, and a cup specimen was prepared for a scent sensuousness evaluation and a sustained release evaluation. The specimen of the obtained plant fiber-containing composite resin molded article was evaluated by the following methods.

Evaluation Item for Composite Resin Molded Article

Aroma Sensuousness Evaluation

By using the obtained cup-shaped specimen, a sensuousness evaluation (aroma sensuousness evaluation) test was carried out with respect to scent. An examiner actually smelled the scent, and evaluated the comfort of the scent of the specimen on a 7-point scale from 1 to 7 (1=very unpleasant, 2=unpleasant, 3=slightly unpleasant, 4=normal, 5=slightly comfortable, 6=comfortable, 7=very comfortable) and the intensity of the scent of the specimen on a 7-point scale from 1 to 7 (1=very weak, 2=weak, 3=slightly weak, 4=suitable, 5=slightly strong, 6=strong, 7=very strong).

Here, as a method of evaluating the sensuousness of the scent, the specimens with the evaluations of 1 to 4 in the comfort of the scent were designated as D, the specimen with the evaluation of 5 was designated as C, the specimen with the evaluation of 6 was designated as B, and the specimen with the evaluation of 7 was designated as A. The specimens with the evaluations of 1 and 2, and 6 and 7 in the intensity of the scent were designated as D, the specimens with the evaluations of 3 and 5 were designated as C, and the specimen with the evaluation of 4 was designated as B. In a case where the evaluation in the comfort of the scent was D, the sensuousness evaluation result was designated as D regardless of the intensity of the scent. In a case where the evaluation in the comfort was C, when the evaluation in the intensity was D, the evaluation result was designated as D; and when the intensity was C or B, the evaluation result was designated as C. In a case where the evaluation in the comfort was B, when the evaluation in the intensity was D, the evaluation result was designated as D; when the evaluation in the intensity was C, the evaluation result was designated as C; and when the evaluation in the intensity was B, the evaluation result was designated as B. In a case where the evaluation in the comfort was A, when the evaluation in the intensity was D, the evaluation result was designated as D; when the evaluation in the intensity was C, the evaluation result was designated as B; and when the evaluation in the intensity was B, the evaluation result was designated as A.

In the evaluation of the specimen of Example 1, the comfort of the scent was 6, the intensity of the scent was 4, and the evaluation result was B.

Aroma Sustained Release Evaluation

By using the obtained cup-shaped specimen, a sustained release evaluation (aroma sustained release evaluation) test was carried out with respect to the scent. Although a sample was normally left at a room temperature condition, the sample was placed in a small hot air dryer at 60° C. for an accelerated test, and the intensity of scent of the sample was evaluated every 24 hours. The test in the environment in which hot air at 60° C. was blown is an accelerated test about 50 times a test in a normal atmosphere at room temperature. The specimens with the evaluations of 1 and 2, and 6 and 7 in the intensity of the scent for greater than or equal to 90 hours were designated as D, the specimens with the evaluations of 3 and 5 were designated as C, and the specimen with the evaluation of 4 was designated as B.

The evaluation of the same specimen was 4, and the evaluation was designated as B. The specimen having the intensity of the scent of 4 for greater than or equal to 120 hours was designated as A.

Elastic Modulus of Composite Resin Molded Article

A tensile test was carried out using the obtained No. 1 dumbbell-shaped specimen. Here, as a method of evaluating elastic modulus, a value of smaller than 1.9 GPa was designated as D, a value of greater than or equal to 1.9 GPa and smaller than 2.7 GPa was designated as C, a value of greater than or equal to 2.7 GPa and smaller than 3.6 GPa was designated as B, and a value of greater than or equal to 3.6 GPa was designated as A.

The elastic modulus of the same specimen was 4.2 GPa, and the evaluation thereof was A.

Crystallinity of Composite Resin Molded Article

Crystallinity of Composite Resin

A fusion (crystallization) peak was measured by differential scanning calorimetry (DSC) measurement, and the amount of heat of fusion was calculated. The crystallinity was calculated by the following Expression. Crystallinity=(Measured amount of heat of fusion/Amount of heat of fusion of perfect crystal)×100 Here, as a method of evaluating crystallinity, the specimen with a crystallinity of less than 30% was designated as D, the specimen with a crystallinity of more than or equal to 30% and less than 60% was designated as B, and the specimen with a crystallinity of more than or equal to 60% was designated as A.

The same composite resin molded article had a crystallinity of 53%, and the evaluation thereof was B.

Crystallinity Around Fiber

A part of the obtained No. 1 dumbbell-shaped specimen was cut out and observed by Raman spectroscopic observation. The specimen in which the crystallinity of the resin around the plant fiber was smaller than 1.05 times crystallinity of a crystal-only portion was designated as D, and the specimen in which the crystallinity was greater than or equal to 1.05 times was designated as B.

The crystallinity of the resin around the plant fiber of the same specimen was 1.12 times the crystallinity of the crystal-only part, and the evaluation was B.

Orientation of Fibers in Skin Layer

A part of the obtained No. 1 dumbbell-shaped specimen was cut out, and a cross-section thereof was measured with a polarization microscope. A surface of the specimen was set as 0°, and an angle of the plant fibers in the skin layer was measured in the fiber length direction, on the obtained polarization microscope measurement image. In a case where the angle of the plant fibers in the fiber length direction was greater than or equal to 70°, the evaluation was designated as D, in a case where the angle of the plant fibers in the fiber length direction was greater than or equal to 30° and smaller than 70°, the evaluation was designated as C, and in a case where the angle of the plant fibers in the fiber length direction was greater than or equal to 0° and smaller than 30°, the evaluation was designated as B.

The angle of the plant fibers in the skin layer of the same specimen was 10° in the fiber length direction, and the evaluation thereof was B.

Thickness of Skin Layer

A part of the obtained No. 1 dumbbell-shaped specimen was cut out, and polarization microscope measurement was carried out. The thickness of the skin layer was measured on the obtained polarization microscope image. In a case where the thickness of the skin layer was greater than 600 μm, the specimen was designated as D, and in a case where the thickness was smaller than or equal to 600 μm, the specimen was designated as B.

The thickness of the skin layer of the same specimen was 430 μm, and the evaluation thereof was B.

Example 2

In Example 2, the amount of plant fibers was increased, and the weight ratio of the base resin:plant fiber:dispersant was changed to 27:70:3. A plant fiber-containing composite resin pellet and a molded article were prepared under the same conditions as in Example 1 except for the above condition. As for the evaluation, the same evaluation as in Example 1 was carried out.

Example 3

In Example 3, fibers of 1 mm that had a larger average particle diameter than that of Example 1 were used as the plant fibers. A cellulose fiber-containing composite resin pellet and a molded article were prepared under the same material conditions and process conditions as in Example 1 except for the above condition. As for the evaluation, the same evaluation as in Example 1 was carried out.

Example 4

In Example 4, the injection molding condition was changed such that the mold temperature during injection molding was increased as compared with Example 1. A cellulose fiber-containing composite resin pellet and a molded article were prepared in the same material conditions and process conditions as in Example 1 except for the above condition. As for the evaluation, the same evaluation as in Example 1 was carried out.

Example 5

In Example 5, plant fibers of $\Delta d=10$ having a larger variation $\Delta d$ in the particle diameter of the fiber than that of Example 1 were used. A cellulose fiber-containing composite resin pellet and a molded article were prepared in the same material conditions and process conditions as in Example 1 except for the above condition. As for the evaluation, the same evaluation as in Example 1 was carried out.

Example 6

In Example 6, a plant fiber-containing composite resin pellet and a molded article were prepared under the same material conditions and process conditions as in Example 1 except that plant fibers of $\Delta d=2$ having a smaller variation in the particle diameter of the plant fiber than that of Example 1 was used. As for the evaluation, the same evaluation as in Example 1 was carried out.

Example 7

In Example 7, the injection molding conditions were changed such that the resin temperature during injection molding was increased and the injection rate was increased as compared with Example 1. A cellulose fiber-containing composite resin pellet and a molded article were prepared in the same material conditions and process conditions as in Example 1 except for the above condition. As for the evaluation, the same evaluation as in Example 1 was carried out.

Example 8

In Example 8, the injection molding conditions were changed such that the resin temperature during injection molding was decreased and the injection rate was decreased as compared with Example 1. A plant fiber-containing composite resin pellet and a molded article were prepared in the same material conditions and process conditions as in Example 1 except for the above conditions. As for the evaluation, the same evaluation as in Example 1 was carried out.

Comparative Example 1

In Comparative Example 1, a composite resin pellet and a molded article were prepared in the same material conditions and process conditions as in Example 1, except that pulp bleached for a sufficiently long time and having almost no residual components such as lignin and hemicellulose was used as the plant fibers. As for the evaluation, the same evaluation as in Example 1 was carried out.

Comparative Example 2

In Comparative Example 2, a cellulose fiber-containing composite resin pellet and a molded article were prepared in the same material conditions and process conditions as in Example 1, except that polystyrene (PS) that is an amorphous resin was used as the base resin. As for the evaluation, the same evaluation as in Example 1 was carried out.

Comparative Example 3

In Comparative Example 3, the amount of plant fibers was reduced as compared with Example 1, and the weight ratio of base resin:plant fiber:dispersant was changed to 89:10:1. A plant fiber-containing composite resin pellet and a molded article were prepared in the same material conditions and process conditions as in Example 1 except for the above conditions. As for the evaluation, the same evaluation as in Example 1 was carried out.

Comparative Example 4

In Comparative Example 4, the amount of plant fibers was increased as compared with Example 1, and the weight ratio of base resin:plant fiber:dispersant was changed to 2.5:95: 2.5. A plant fiber-containing composite resin pellet and a molded article were prepared in the same material conditions and process conditions as in Example 1 except for the above conditions. As for the evaluation, the same evaluation as in Example 1 was carried out.

The measurement results in Examples 1 to 8 and Comparative Examples 1 to 4 were illustrated in FIG. 3B.

In Example 2 in which the amount of plant fibers was increased, since a fiber reinforcing effect by the plant fibers was increased as compared with Example 1, the elastic modulus was 5.1 GPa. Due to the increase in the amount of plant fibers, the crystallinity increased to 63%. In addition, as the amount of plant fibers was increased, the amount of aroma components was increased, and the aroma sensuousness evaluation result was B and the sustained release evaluation result was B.

In Example 3 in which the fibers having an average particle diameter of 1 mm were used, as the fiber size was increased as compared with Example 1, the aroma component contained inside each fiber was increased, so that sustained release was improved, and the aroma sustained release evaluation was A.

In Example 4 in which the mold temperature during injection molding was increased, since the composite resin was slowly cooled as compared with Example 1, the crystallinity was increased to 64% and the aroma sustained release evaluation was A.

In Example 5 in which the plant fibers having a fiber particle diameter variation $\Delta d=10$ were used, the amount of aroma components contained varies depending on the sizes of the fibers, and the release period of the aroma component from the fiber of each size varies accordingly. Therefore, the sustained release of aroma was improved, and the evaluation result was A.

In Example 6 in which the plant fibers having the fiber particle diameter variation $\Delta d=2$ were used, the fiber sizes were almost the same each other and the release period of the aroma components was also almost the same each other, so that the aroma sustained release evaluation result was C.

In Example 7 in which the resin temperature during injection molding was increased and the injection rate was increased, as the thickness of the skin layer was decreased as compared with Example 1, the core layer was increased, so that the release rate of aroma components was reduced, and the sustained release evaluation result was A.

In Example 8 in which the resin temperature during injection molding was decreased and the injection rate was lowered, as the thickness of the skin layer was increased as compared with Example 1, the ratio of the core layer to the entire resin was decreased. Therefore, the release of aroma components could not be suppressed, and the sustained release evaluation result was C.

From the above, the results of Examples 2, 3, 4, 5, and 7 were equal to or higher than that of Example 1 in all the tests.

In Comparative Example 1 in which pulp having almost no residual components such as lignin and hemicellulose was used as the plant fibers, almost no aroma component was present. Therefore, in the aroma sensuousness evaluation, the comfort of the scent was evaluated as 5, and the scent intensity was evaluated as 1, and the evaluation result was D.

In Comparative Example 2 in which polystyrene (PS) that is an amorphous resin was used as the base resin, the release rate of the aroma component could not be suppressed since there was no crystal component of the resin, and the sustained release evaluation result was D.

In Comparative Example 3 in which the weight ratio of plant fibers to the entire raw material was decreased, since the amount of cellulose fibers was small, the crystallinity was low, and since the total amount of aroma components was small, the sensuousness evaluation result of the scent was D. In addition, the fiber reinforcing effect on the composite resin was decreased, and the elastic modulus was 2.0 GPa.

In Comparative Example 4 in which the weight ratio of plant fibers to the entire raw material was increased, since the amount of the fibers is large, the viscosity was too high, the load on the device was increased, and stable kneading and molding could not be performed. Therefore, the specimen could not be prepared and could not be evaluated.

From the above evaluations, in a case where the amorphous resin was used, the sustained release for a long period of time was reduced. In a case where the plant fiber concentration was lowered, the amount of aroma components is reduced and the aroma was not sufficient. In a case where the plant fiber concentration was too high, the stable kneading and molding could not be performed.

From the above, it was found that the composite resin molded article could be stably produced by using the plant fibers containing the aroma components and the crystalline resin and setting the content of the plant fiber to more than or equal to 50% by mass and less than or equal to 90% by mass, and had the high mechanical strength and the sustained release of aroma for a long period of time.

In the present disclosure, any of the exemplary embodiments and/or examples among the various exemplary embodiments and/or examples described above is combined as appropriate, and the effects provided by each of the exemplary embodiments and/or examples can be obtained.

According to the composite resin molded article of the present disclosure, it is possible to provide the molded article having excellent mechanical strength as compared with the general-purpose resin in the related art, having sensuous characteristics such as color, texture, and scent derived from plant materials, and having the sustained release of aroma for a long period of time. Since the composite resin molded article according to the present disclosure cannot be easily affected by the environment and can have the sustained release of aroma for a long period of time, a relaxation effect can be imparted to daily necessities and the like. Furthermore, since the composite resin molded article according to the present disclosure has excellent mechanical strength, the composite resin molded article can be used for consumer electronics housings, building materials, and automobile parts.

What is claimed is:

1. A composite resin molded article comprising:
a base resin;
plant fibers; and
a dispersant,
wherein each of the plant fibers contains an aroma component,
the base resin is a crystalline resin,
in a case where a total content of the base resin, the plant fibers, and the dispersant is 100% by mass, a content of the plant fibers is more than or equal to 50% by mass and less than or equal to 90% by mass, and
a crystallinity of a portion of the base resin close to the plant fibers in the composite resin molded article is greater than or equal to 1.05 times a crystallinity of a portion of the base resin away from the plant fibers in the composite resin molded article.

2. The composite resin molded article of claim 1,
wherein an average particle diameter of the plant fibers is greater than or equal to 1 µm and smaller than or equal to 3 mm.

3. The composite resin molded article of claim 1,
wherein crystallinity of the base resin is more than or equal to 30%.

4. The composite resin molded article of claim 1,
wherein a particle diameter variation Δd is greater than or equal to 6, the particle diameter variation Δd being represented by Δd=d90/d10 using a particle diameter d90 and a particle diameter d10, a ratio of particles smaller than or equal to the particle diameter d90 in a particle size distribution of the plant fibers being 90%, a ratio of particles smaller than or equal to the particle diameter d10 in a particle size distribution of the plant fibers being 10%.

5. A composite resin molded article comprising:
a base resin;
plant fibers; and
a dispersant,
wherein each of the plant fibers contains an aroma component,
the base resin is a crystalline resin,
in a case where a total content of the base resin, the plant fibers, and the dispersant is 100% by mass, a content of the plant fibers is more than or equal to 50% by mass and less than or equal to 90% by mass, and
each of the plant fibers in a skin layer of the composite resin molded article is oriented in a fiber length direction at an angle greater than or equal to 0° and smaller than or equal to 30° with respect to a surface of the composite resin molded article.

6. The composite resin molded article of claim 5,
wherein an average particle diameter of the plant fibers is greater than or equal to 1 µm and smaller than or equal to 3 mm.

7. The composite resin molded article of claim 5,
wherein crystallinity of the base resin is more than or equal to 30%.

8. The composite resin molded article of claim 5,
wherein a particle diameter variation Δd is greater than or equal to 6, the particle diameter variation Δd being represented by Δd=d90/d10 using a particle diameter d90 and a particle diameter d10, a ratio of particles smaller than or equal to the particle diameter d90 in a particle size distribution of the plant fibers being 90%, a ratio of particles smaller than or equal to the particle diameter d10 in a particle size distribution of the plant fibers being 10%.

9. A composite resin molded article comprising:
a base resin;
plant fibers; and
a dispersant,
wherein each of the plant fibers contains an aroma component,
the base resin is a crystalline resin,
in a case where a total content of the base resin, the plant fibers, and the dispersant is 100% by mass, a content of the plant fibers is more than or equal to 50% by mass and less than or equal to 90% by mass, and
a thickness of a skin layer on the surface of the composite resin molded article is smaller than or equal to 600 μm.

10. The composite resin molded article of claim 9,
wherein an average particle diameter of the plant fibers is greater than or equal to 1 μm and smaller than or equal to 3 mm.

11. The composite resin molded article of claim 9,
wherein crystallinity of the base resin is more than or equal to 30%.

12. The composite resin molded article of claim 9,
wherein a particle diameter variation Δd is greater than or equal to 6, the particle diameter variation Δd being represented by Δd=d90/d10 using a particle diameter d90 and a particle diameter d10, a ratio of particles smaller than or equal to the particle diameter d90 in a particle size distribution of the plant fibers being 90%, a ratio of particles smaller than or equal to the particle diameter d10 in a particle size distribution of the plant fibers being 10%.

* * * * *